(12) United States Patent
Oshima

(10) Patent No.: US 8,633,281 B2
(45) Date of Patent: Jan. 21, 2014

(54) CONJUGATED DIENE POLYMER, PROCESS FOR PRODUCING CONJUGATED DIENE POLYMER, CONJUGATED DIENE POLYMER COMPOSITION AND PROCESS FOR PRODUCING CONJUGATED DIENE POLYMER COMPOSITION

(75) Inventor: Mayumi Oshima, Yokohama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 494 days.

(21) Appl. No.: 12/440,254

(22) PCT Filed: Sep. 15, 2006

(86) PCT No.: PCT/JP2006/018797
§ 371 (c)(1),
(2), (4) Date: Apr. 6, 2009

(87) PCT Pub. No.: WO2008/032417
PCT Pub. Date: Mar. 20, 2008

(65) Prior Publication Data
US 2010/0130686 A1    May 27, 2010

(51) Int. Cl.
*C08F 36/14*     (2006.01)
*C08F 8/30*      (2006.01)

(52) U.S. Cl.
USPC ......... 525/331.9; 525/192; 525/102; 525/105

(58) Field of Classification Search
USPC ............ 525/192, 102, 332.8, 333.1, 333.2, 525/331.9, 105
See application file for complete search history.

(56) References Cited

U.S. PATENT DOCUMENTS

| | | | |
|---|---|---|---|
| 4,957,976 A * | 9/1990 | Takao et al. | 525/340 |
| 5,189,109 A | 2/1993 | Imai et al. | |
| 5,665,812 A | 9/1997 | Gorce et al. | |
| 6,117,927 A * | 9/2000 | Toba et al. | 524/261 |
| 2005/0203251 A1 * | 9/2005 | Oshima et al. | 525/192 |

FOREIGN PATENT DOCUMENTS

| | | | |
|---|---|---|---|
| JP | 60-72907 A | | 4/1985 |
| JP | 63-186748 A | | 8/1988 |
| JP | 1-217047 A | | 8/1989 |
| JP | 8-53513 A | | 2/1996 |
| JP | 9-87426 A | | 3/1997 |
| JP | 9-235324 A | | 9/1997 |
| JP | 11-189616 A | | 7/1999 |
| JP | 2001-131229 | | 5/2001 |
| JP | 2001-131230 A | | 5/2001 |
| JP | 2001-158834 | * | 6/2001 |
| JP | 2001-158834 A | | 6/2001 |
| JP | 2005-290355 A | | 10/2005 |

OTHER PUBLICATIONS

Third party observation dated Apr. 2, 2012, filed in Japanese Application No. 2006-249184.
Office Action issued Jan. 17, 2012 in Japanese Patent Application No. 2006-249184 with English translation.
Third party observation dated Oct. 26, 2011, filed in counterpart Japanese Patent Application No. 2006-249184.

\* cited by examiner

*Primary Examiner* — Ling Choi
*Assistant Examiner* — Chun-Cheng Wang
(74) *Attorney, Agent, or Firm* — Sughrue Mion, PLLC

(57) ABSTRACT

The present invention provides a conjugated diene polymer, a method for producing a conjugated diene polymer, a conjugated diene polymer composition and a method for producing a conjugated diene polymer composition. The conjugated diene polymer is a conjugated diene polymer having a conjugated diene-based monomer unit and a group of the formula (I), wherein assuming the whole area of the molecular weight distribution curve obtained by gel permeation chromatography as 100%, the peak area of the molecular weight peak at the lowest molecular weight side is not less than 50%:

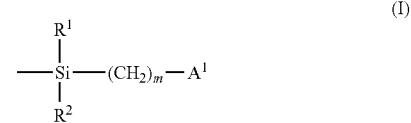

wherein $R^1$ and $R^2$ represent independently a hydrocarbon group, hydrocarbon oxy group or hydroxyl group, m represents an integer of 0 to 10, and $A^1$ represents a polar functional group free of an active hydrogen atom.

7 Claims, 3 Drawing Sheets

CONJUGATED DIENE POLYMER, PROCESS FOR PRODUCING CONJUGATED DIENE POLYMER, CONJUGATED DIENE POLYMER COMPOSITION AND PROCESS FOR PRODUCING CONJUGATED DIENE POLYMER COMPOSITION

TECHNICAL FIELD

The present invention relates to a conjugated diene polymer, a method for producing a conjugated diene polymer, a conjugated diene polymer composition and a method for producing a conjugated diene polymer composition.

BACKGROUND ART

Recently, because of enhancement of an interest in environmental problems, fuel saving is intensely required for automobiles, and excellent fuel saving is required also for polymer compositions used in automobile tires. As the polymer compositions for automobile tires, use is made of polymer compositions containing a conjugated diene polymer such as polybutadiene, butadiene-styrene copolymer, and fillers such as carbon black, silica. For example, known is a polymer composition using, as the conjugated diene polymer, a polymer obtained by modification with a tin halide compound of a polymer prepared by copolymerizing butadiene and styrene using an alkyllithium as a polymerization initiator (for example, JP-A-60-255838, U.S. Pat. No. 4,742,124).

Further, there are suggested a polymer composition using, as the conjugated diene polymer, a polymer obtained by modification with an acrylamide having a dialkylamino group of a polymer prepared by copolymerizing butadiene and styrene using an alkyllithium as a polymerization initiator (for example, JP-A-1-217047, U.S. Pat. No. 5,189,109), a polymer composition using, as the conjugated diene polymer, a polymer obtained by modification with an alkoxysilane having a dialkylamino group of a polymer prepared by polymerizing butadiene or copolymerizing butadiene and styrene using an alkyllithium as a polymerization initiator (for example, JP-A-63-186748, U.S. Pat. No. 4,957,976, JP-A-2005-290355, US 2005/0203251 A1), and the like, as polymer compositions excellent in fuel saving.

DISCLOSURE OF THE INVENTION

The polymer compositions using the above-described conventional conjugated diene polymers, however, are not sufficiently satisfactory in energy saving, particularly in the case of use of silica as a filler.

Under such conditions, a problem to be solved by the present invention is to provide a conjugated diene polymer which is capable of producing a polymer composition excellent in energy saving in the case of mixing of a filler, particularly mixing of silica, a method for producing the conjugated diene polymer, a polymer composition obtained by mixing the conjugated diene polymer and silica, and a method for producing the polymer composition.

The present inventors have intensively studied to solve the above-described problem, and resultantly completed the present invention.

That is, the present invention provides a conjugated diene polymer comprising a conjugated diene-based monomer unit and a group of the formula (I), wherein assuming the whole area of the molecular weight distribution curve obtained by gel permeation chromatography as 100%, the peak area of the molecular weight peak at the lowest molecular weight side is not less than 50%:

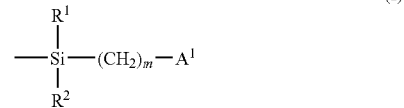

wherein $R^1$ and $R^2$ represent independently a hydrocarbon group, hydrocarbon oxy group or hydroxyl group, m represents an integer of 0 to 10, and $A^1$ represents a polar functional group free of an active hydrogen atom.

The present invention provides a method for producing a conjugated diene polymer, comprising steps 1 and 2:

step 1: polymerizing a monomer containing a conjugated diene in a hydrocarbon solvent in the presence of an alkali metal catalyst to obtain a conjugated diene polymer having at its end an alkali metal derived from the catalyst, and step 2: adding a silicon compound of the formula (IV) at a time to the hydrocarbon solution of the conjugated diene polymer, to modify the conjugated diene polymer with the silicon compound:

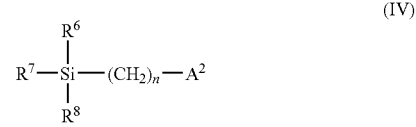

wherein, $R^6$, $R^7$ and $R^8$ represent independently a hydrocarbon group having 1 to 4 carbon atoms or a hydrocarbon oxy group having 1 to 4 carbon atoms, at least one of $R^6$, $R^7$ and $R^8$ is a hydrocarbon oxy group having 1 to 4 carbon atoms, n represents an integer of 0 to 10, and $A^2$ represents a polar functional group free of an active hydrogen atom.

Also, the present invention provides a conjugated diene polymer composition comprising the above-described conjugated diene polymer, and silica.

Further, the present invention provides a method for producing a conjugated diene polymer composition, comprising steps 1, 2 and 3:

step 1: polymerizing a monomer containing a conjugated diene in a hydrocarbon solvent in the presence of an alkali metal catalyst to obtain a conjugated diene polymer having at its end an alkali metal derived from the catalyst, step 2: adding a silicon compound of the formula (IV) at a time to the hydrocarbon solution of the conjugated diene polymer, to modify the conjugated diene polymer with the silicon compound, and step 3: mixing the conjugated diene polymer obtained in the step 2 and silica:

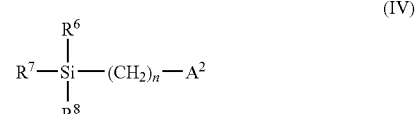

wherein $R^6$, $R^7$ and $R^8$ represent independently a hydrocarbon group having 1 to 4 carbon atoms or a hydrocarbon oxy group having 1 to 4 carbon atoms, at least one of $R^6$, $R^7$ and $R^8$ is a hydrocarbon oxy group having 1 to 4 carbon atoms, n represents an integer of 0 to 10, and $A^2$ represents a polar functional group free of an active hydrogen atom.

MODE FOR CARRYING OUT THE INVENTION

Figure 1:
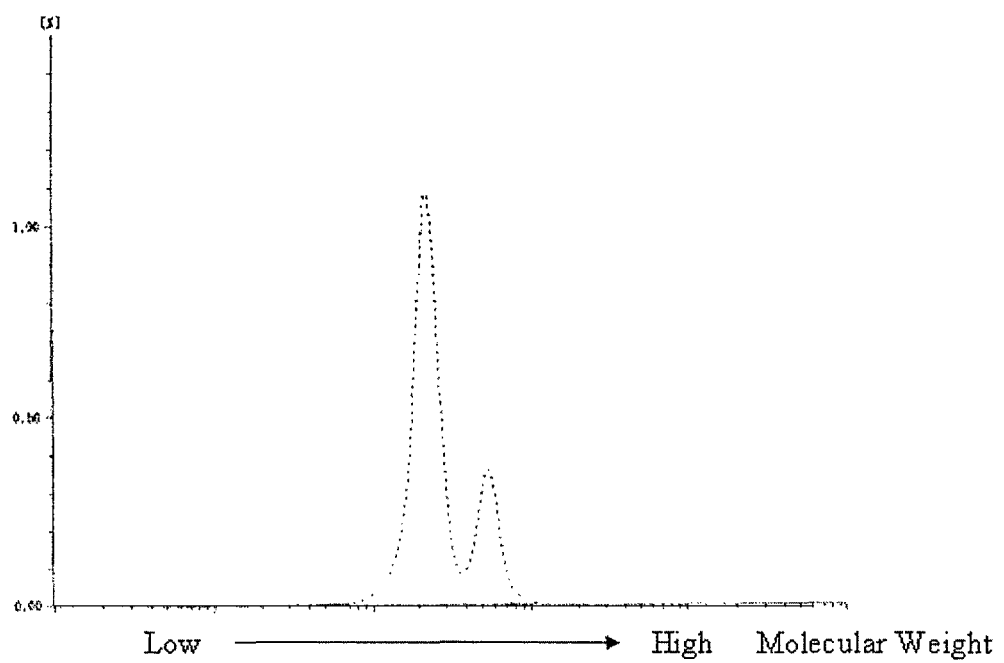
FIG. 1 shows an example of the molecular weight distribution curve of a polymer.

The conjugated diene polymer of the present invention is a conjugated diene polymer having a conjugated diene-based monomer unit and a group of the formula (I), wherein assuming the whole area of the molecular weight distribution curve obtained by gel permeation chromatography as 100%, the peak area of the molecular weight peak at the lowest molecular weight side is not less than 50%:

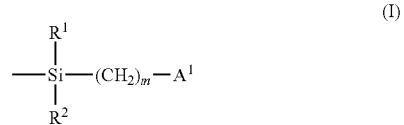

(I)

wherein $R^1$ and $R^2$ represent independently a hydrocarbon group, hydrocarbon oxy group or hydroxyl group, m represents an integer of 0 to 10, and $A^1$ represents a polar functional group free of an active hydrogen atom.

Examples of the conjugated diene include 1,3-butadiene, isoprene, 1,3-pentadiene, 2,3-dimethyl-1,3-butadiene, and 1,3-hexadiene, and each of these may be used alone or in combination with another or more. Preferable from the standpoint of easy availability in production are 1,3-butadiene and isoprene.

$R^1$ and $R^2$ represent independently a hydrocarbon group, hydrocarbon oxy group or hydroxyl group.

Examples of the hydrocarbon group include a methyl group, ethyl group, n-propyl group, isopropyl group, n-butyl group, sec-butyl group, and t-butyl group. The hydrocarbon group may also be a group composed of a polymer chain such as a polymer chain having a conjugated diene-based monomer unit, or the like. Preferable as these hydrocarbon groups are a methyl group and an ethyl group.

Examples of the hydrocarbon oxy group include a methoxy group, ethoxy group, n-propoxy group, isopropoxy group, n-butoxy group, sec-butoxy group, t-butoxy group. Preferable as these hydrocarbon oxy groups are a methoxy group and an ethoxy group.

As $R^1$ and $R^2$, hydrocarbon oxy groups are preferable and a methoxy group and an ethoxy group are more preferable, from the standpoint of enhancement of fuel saving.

m represents an integer of 0 to 10. It is preferably not less than 3 from the standpoint of enhancement of fuel saving, and preferably not more than 4 from the standpoint of enhancement of economic efficiency in production.

$A^1$ represents a polar functional group free of an active hydrogen atom, and includes a group of the formula (II), a group of the formula (III), and the like.

(II)

wherein $R^3$ and $R^4$ represent independently a hydrocarbon group having 1 to 6 carbon atoms optionally having a nitrogen atom, oxygen atom or silicon atom, and $R^3$ and $R^4$ may be connected to form a cyclic structure:

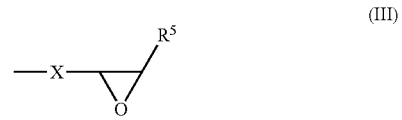

(III)

wherein X represents a divalent hydrocarbon group having 1 to 6 carbon atoms optionally having an oxygen atom, and $R^5$ represents hydrogen or hydrocarbon group having 1 to 6 carbon atoms.

$R^3$ and $R^4$ represent independently a hydrocarbon group having 1 to 6 carbon atoms optionally having a nitrogen atom, oxygen atom or silicon atom.

Examples of the hydrocarbon group include a methyl group, ethyl group, n-propyl group, isopropyl group, n-butyl group, sec-butyl group, t-butyl group, n-pentyl group, neopentyl group, isopentyl group, n-hexyl group, cyclohexyl group, phenyl group, methoxymethyl group, methoxyethyl group, methoxypropyl group, methoxybutyl group, methoxypentyl group, ethoxymethyl group, ethoxyethyl group, ethoxypropyl group, ethoxybutyl group, ethoxypentyl group, trimethylsilyl group, and t-butyldimethyl-silyl group.

$R^3$ and $R^4$ may be connected, and groups obtained by connecting $R^3$ and $R^4$ include alkylene groups such as a trimethylene group, tetramethylene group, pentamethylene group, hexamethylene group; oxyalkylene groups such as an oxydiethylene group, oxydipropylene group; nitrogen-containing groups such as a group represented by —$CH_2CH_2$—NH—$CH_2$—, a group represented by —$CH_2CH_2$—N=CH—.

$R^3$ and $R^4$ represent preferably a methyl group, ethyl group, n-propyl group, trimethylsilyl group. As the group obtained by connecting $R^3$ and $R^4$, a group represented by —$CH_2CH_2$—NH—$CH_2$— and a group represented by —$CH_2CH_2$—N=CH— are preferable.

X represents a divalent hydrocarbon group having 1 to 6 carbon atoms optionally having an oxygen atom.

Examples of the hydrocarbon group include an ethylene group, propylene group, butylene group, 1-oxyethylene group, 1-oxytrimethylene group, and 1-oxytetramethylene group.

X represents preferably a 1-oxytrimethylene group.

$R^5$ represents hydrogen or hydrocarbon group having 1 to 6 carbon atoms.

Examples of the hydrocarbon group include a methyl group, ethyl group, n-propyl group, isopropyl group, n-butyl group, sec-butyl group, t-butyl group, n-pentyl group, neopentyl group, isopentyl group, n-hexyl group, cyclohexyl group, and phenyl group.

$R^5$ represents preferably hydrogen or methyl group.

The group of the formula (II) includes non-cyclic amino groups and cyclic amino groups.

Examples of the non-cyclic amino group include a dimethyl-amino group, diethylamino group, ethylmethylamino group, di(methoxymethyl)amino group, di(methoxyethyl)

amino group, di(ethoxymethyl)amino group, di(ethoxyethyl) amino group, di(t-butyldimethyl-silyl)amino) group, and (di (trimethylsilyl)amino group.

Examples of the cyclic amino group include a 1-pyrrolidinyl group, piperidino group, 1-polymethyleneimino groups such as 1-hexamethyleneimino group, 1-heptamethyleneimino group, 1-octamethyleneimino group, 1-decamethyleneimino group, 1-dodecamethyleneimino group, 1-tetradecamethyleneimino group, 1-octadecamethyleneimino group and the like. The cyclic amino group includes a 1-imidazolyl group, 4,5-dihydro-1-imidazolyl group, 1-imidazolidinyl group, 1-piperazinyl group, and morpholino group.

Examples of the group of the formula (III) include a 3-glycidoxyethyl group, and 3-glycidoxypropyl group.

$A^1$ is preferably a group of the formula (II) from the standpoint of economic efficiency and easy availability, and more preferably a non-cyclic amino group.

The conjugated diene polymer of the present invention may have a monomer unit based on other monomer, in addition to a conjugated diene-based monomer unit (conjugated diene unit) and a group of the formula (I).

Examples of the other monomers include aromatic vinyls, vinylnitrile, and unsaturated carboxylates.

The aromatic vinyl includes styrene, α-methylstyrene, vinyltoluene, vinylnaphthalene, divinylbenzene, trivinylbenzene, divinylnaphthalene.

The vinylnitrile includes acrylonitrile and the like.

The unsaturated carboxylate includes methyl acrylate, ethyl acrylate, methyl methacrylate, ethyl methacrylate and the like.

Of them, styrene is preferable from the standpoint of easy availability.

The conjugated diene polymer of the present invention preferably has an aromatic vinyl-based monomer unit (aromatic vinyl unit) from the standpoint of enhancement of strength, and the content of the aromatic vinyl unit is preferably not less than 10% by weight (the content of the conjugated diene unit is not more than 90% by weight), more preferably not less than 15% by weight (the content of the conjugated diene unit is not more than 85% by weight), assuming the total amount of the conjugated diene unit and the aromatic vinyl unit as 100% by weight. From the standpoint of enhancement of fuel saving, the content of the aromatic vinyl unit is preferably not more than 50% by weight (the content of the conjugated diene unit is not less than 50% by weight), more preferably not more than 45% by weight (the content of the conjugated diene unit is not less than 55% by weight).

Figure 2:
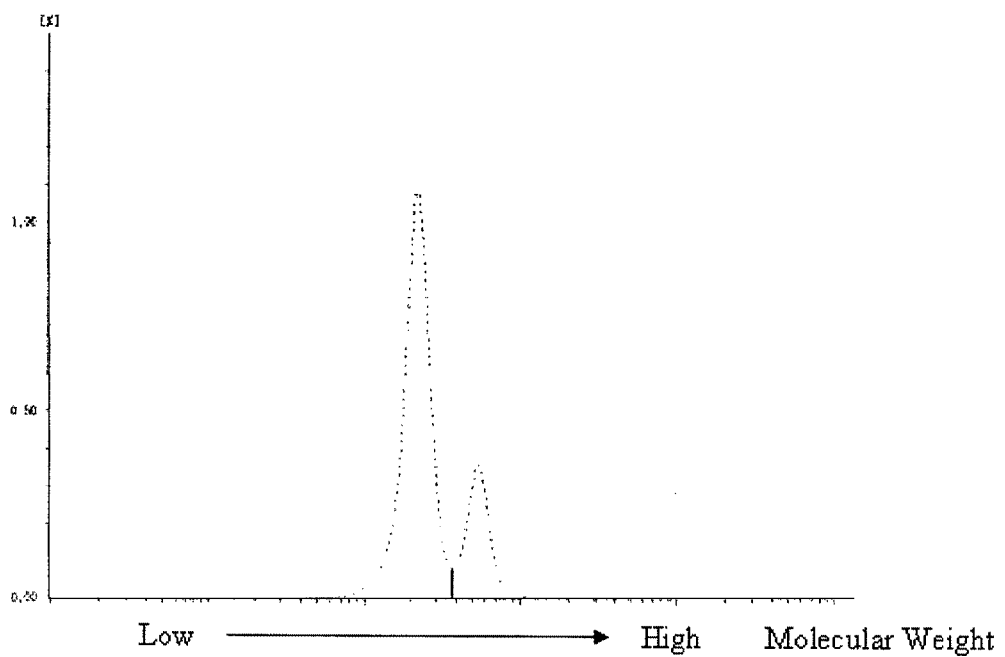
FIG. 2 shows an example of the border line of a peak adjacent to the molecular weight peak at the lowest molecular weight side.
Figure 3:
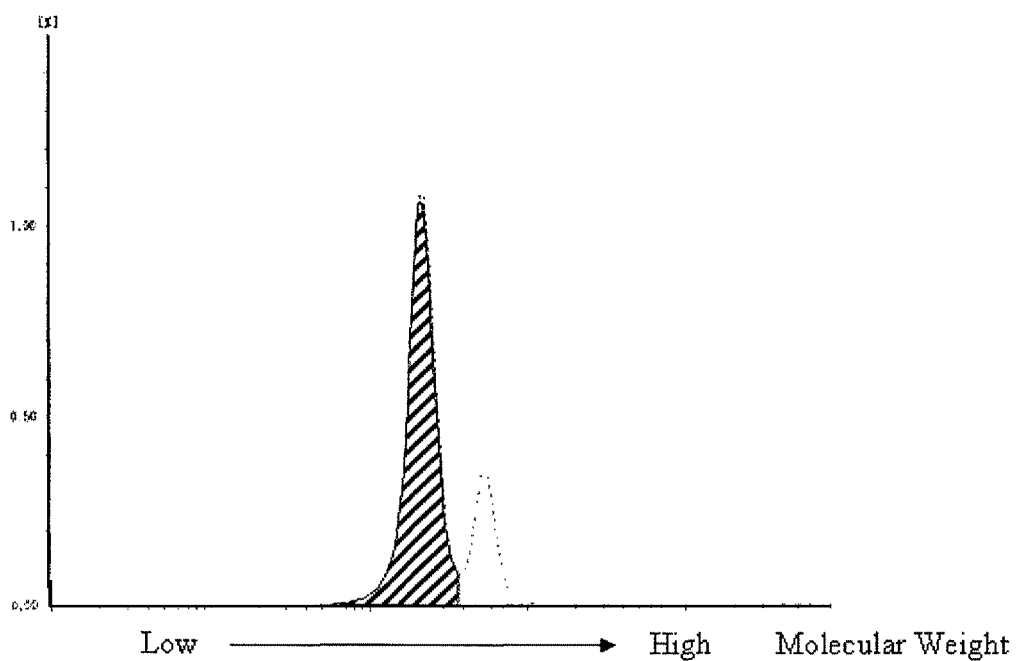
FIG. 3 shows an example of the area the molecular weight peak at the lowest molecular weight side.

The conjugated diene polymer of the present invention is preferably a conjugated diene polymer in which, assuming the whole area of the molecular weight distribution curve obtained by gel permeation chromatography as 100%, the peak area of the molecular weight peak of a conjugated diene polymer at the lowest molecular weight side is not less than 50%. The peak area is more preferably not less than 55%, further preferably not less than 60%. From the standpoint of enhancement of kneading processing property, the peak area is preferably not more than 95%, more preferably not more than 90%. When a curve at the higher molecular weight side of the molecular peak at the lowest molecular weight side (hereinafter, described as "peak L") does not lower to the base line (FIG. 1) in the molecular weight distribution curve obtained by gel permeation chromatography, namely, when the peak L overlaps with an adjacent peak, a border line is drawn from the minimum point of a curve present between a peak top of the peak L and a peak top of an adjacent peak to the base line vertically (FIG. 2), and the region of the lower molecular weight side than the border line is regarded as the area of the peak L (FIG. 3).

The Mooney viscosity ($ML_{1+4}$) of the conjugated diene polymer of the present invention is preferably not less than 10, more preferably not less than 20 from the standpoint of enhancement of mechanical strength. It is preferably not more than 200, more preferably not more than 150 from the standpoint of enhancement of processing property. The Mooney viscosity ($ML_{1+4}$) is measured at 100° C. according to JIS K6300 (1994).

The conjugated diene polymer of the present invention has a vinyl bonding amount of preferably not more than 70 mol %, more preferably not more than 60 mol % from the standpoint of enhancement of fuel saving, assuming the content of a conjugated diene unit as 100 mol %. It is preferably not less than 10 mol %, more preferably not less than 15 mol % from the standpoint of enhancement of tire gripping performance. The vinyl bonding amount is measured by absorption intensity around 910 $cm^{-1}$, which is an absorption peak of a vinyl group, by an infrared spectroscopy.

The method for producing a conjugated diene polymer of the present invention is, for example, a method having the step 1 and step 2.

step 1: polymerizing a monomer containing a conjugated diene in a hydrocarbon solvent in the presence of an alkali metal catalyst to obtain a conjugated diene polymer having at its end an alkali metal derived from the catalyst, step 2: adding a silicon compound of the formula (IV) at a time to the hydrocarbon solution of the conjugated diene polymer, to modify the conjugated diene polymer with the silicon compound:

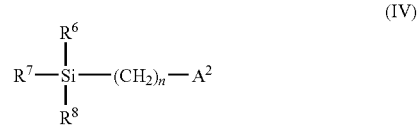

(IV)

wherein, $R^6$, $R^7$ and $R^8$ represent independently a hydrocarbon group having 1 to 4 carbon atoms or a hydrocarbon oxy group having 1 to 4 carbon atoms, at least one of $R^6$, $R^7$ and $R^8$ is a hydrocarbon oxy group having 1 to 4 carbon atoms, n represents an integer of 0 to 10, and $A^2$ represents a polar functional group free of an active hydrogen atom.

The alkali metal catalyst used in the step 1 includes alkali metals, organic alkali metal compounds, complexes of an alkali metal and a polar compound, oligomers having an alkali metal, and the like.

Examples of the alkali metal include lithium, sodium, potassium, rubidium, and cesium.

Examples of the organic alkali metal compound include ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethyl-aminopropyllithium, diethylaminopropyllithium, t-butyldimethyl-silyloxypropyllithium, N-morpholinopropyllithium, lithiumhexamethyleneimide, lithium pyrrolidide, lithium piperidide, lithiumheptamethyleneimide, lithiumdodecamethyleneimide, 1,4-dithio-butene-2, sodiumnaphthalene, sodium biphenyl, and potassiumnaphthalene Examples of the complex of an alkali metal and a polar compound include a potassium tetrahydrofuran complex, and potassium diethoxyethane complex.

Examples of the oligomer having an alkali metal include a sodium salt of α-methylstyrene tetramer.

Of them, organolithium compounds or organosodium compounds are preferable, and organolithium compounds or organosodium compounds having 2 to 20 carbon atoms are more preferable.

The hydrocarbon solvent in the step 1 does not deactivate an alkali metal catalyst, and includes aliphatic hydrocarbons, aromatic hydrocarbons, alicyclic hydrocarbons, and the like.

Examples of the aliphatic hydrocarbon include propane, n-butane, iso-butane, n-pentane, iso-pentane, n-hexane, propene, 1-butene, iso-butene, trans 2-butene, cis 2-butene, 1-pentene, 2-pentene, 1-hexene, and 2-hexene.

Examples of the aromatic hydrocarbon include benzene, toluene, xylene, and ethylbenzene.

Examples of the alicyclic hydrocarbon include cyclopentane, and cyclohexane.

These are used singly or in combination of two or more. Of them, hydrocarbons having 2 to 12 carbon atoms are preferable.

In the step 1, a monomer containing a conjugated diene is polymerized, to produce a conjugated diene polymer having at its end an alkali metal derived from the above-described alkali metal catalyst.

Examples of the conjugated diene include 1,3-butadiene, isoprene, 1,3-pentadiene, 2,3-dimethyl-1,3-butadiene, and 1,3-hexadiene. These are used singly or in combination of two or more. Of them, 1,3-butadiene and isoprene are preferable from the standpoint of easy availability.

In the step 1, the conjugated diene may be polymerized singly, or the conjugated diene and other monomer may be polymerized in combination.

The other monomers include aromatic vinyls, vinylnitrile, unsaturated carboxylates, and the like.

Examples of the aromatic vinyl include styrene, α-methylstyrene, vinyltoluene, vinylnaphthalene, divinylbenzene, trivinylbenzene, divinylnaphthalene.

The vinylnitrile includes acrylonitrile and the like.

The unsaturated carboxylate includes methyl acrylate, ethyl acrylate, methyl methacrylate, and ethyl methacrylate.

Of them, styrene is preferable from the standpoint of easy availability.

The polymerization of the step 1 may be carried out in the presence of an agent of regulating the vinyl bonding amount of a conjugated diene unit, an agent of regulating the distribution of a conjugated diene unit and a monomer unit based on a monomer other than the conjugated diene in a conjugated diene polymer chain (hereinafter, collectively described as "regulator"), and the like.

The regulator includes ether compounds, tertiary amines, phosphine compounds and the like.

Examples of the ether compound include cyclic ethers such as tetrahydrofuran, tetrahydropyran, and 1,4-dioxane; aliphatic monoethers such as diethylether, and dibutyl ether; aliphatic diethers such as ethylene glycol dimethyl-ether, ethylene glycol diethylether, ethylene glycol dibutyl ether, diethylene glycol diethylether, and diethylene glycol dibutyl ether; aromatic ethers such as diphenylether, and anisole.

Examples of the tertiary amine include triethylamine, tripropylamine, tributylamine, N,N,N',N'-tetramethylethylenediamine, N,N-diethylaniline, pyridine, and quinoline.

Examples of the phosphine compound include trimethylphosphine, triethylphosphine, and triphenylphosphine.

Each of these may be used alone or in combination with another or more.

The polymerization temperature in the step 1 is usually 30 to 100° C., preferably 35 to 65° C., and the polymerization time is usually 10 minutes to 5 hours.

In the step 2, a silicon compound of the formula (IV) is added to the hydrocarbon solution of the conjugated diene polymer having at its end an alkali metal obtained in the step 1, to modify the conjugated diene polymer with the silicon compound:

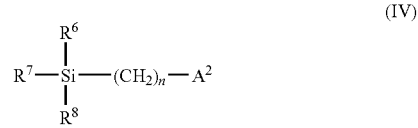

wherein, $R^6$, $R^7$ and $R^8$ represent independently a hydrocarbon group having 1 to 4 carbon atoms or a hydrocarbon oxy group having 1 to 4 carbon atoms, at least one of $R^6$, $R^7$ and $R^8$ is a hydrocarbon oxy group having 1 to 4 carbon atoms, n represents an integer of 0 to 10, and $A^2$ represents a polar functional group free of an active hydrogen atom.

$R^6$, $R^7$ and $R^8$ represent independently a hydrocarbon group having 1 to 4 carbon atoms or a hydrocarbon oxy group having 1 to 4 carbon atoms. At least one of $R^6$, $R^7$ and $R^8$ is a hydrocarbon oxy group having 1 to 4 carbon atoms, and it is preferable that all of $R^6$, $R^7$ and $R^8$ represent a hydrocarbon oxy group having 1 to 4 carbon atoms.

Examples of the hydrocarbon group having 1 to 4 carbon atoms represented by $R^6$, $R^7$ and $R^8$ include a methyl group, ethyl group, n-propyl group, isopropyl group, n-butyl group, sec-butyl group, and t-butyl group. As these hydrocarbon groups, a methyl group or ethyl group is preferable.

Examples of the hydrocarbon oxy group having 1 to 4 carbon atoms represented by $R^6$, $R^7$ and $R^8$ include a methoxy group, ethoxy group, n-propoxy group, isopropoxy group, n-butoxy group, sec-butoxy group, and t-butoxy group. As these hydrocarbon oxy groups, a methoxy group or ethoxy group is preferable.

n represents an integer of 0 to 10. It is preferably not less than 3 from the standpoint of enhancement of fuel saving and preferably not more than 4 from the standpoint of enhancement of economic efficiency in production.

$A^2$ represents a polar functional group free of an active hydrogen atom, and includes a group of the formula (II), a group of the formula (III), and the like.

wherein, $R^3$ and $R^4$ represent independently a hydrocarbon group having 1 to 6 carbon atoms optionally having a nitrogen atom, oxygen atom or silicon atom, and $R^3$ and $R^4$ may be connected to form a cyclic structure:

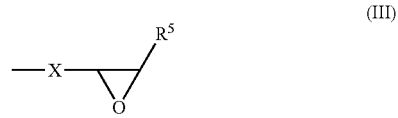

wherein, X represents a divalent hydrocarbon group having 1 to 6 carbon atoms optionally having an oxygen atom, and $R^5$ represents hydrogen or hydrocarbon group having 1 to 6 carbon atoms.

Examples of the group of the formula (II), the group of the formula (III), $R^3$, $R^4$ and $R^5$ and X for $A^2$ are the same as the examples of the group of the formula (II), the group of the formula (III), $R^3$, $R^4$ and $R^5$ and X for $A^1$, and preferable examples of the group of the formula (II), the group of the formula (III), $R^3$, $R^4$ and $R^5$ and X thereof are the same as the preferable examples of the group of the formula (II), the group of the formula (III), $R^3$, $R^4$ and $R^5$ and X for $A^1$. Preferable groups represented by $A^2$ are the same as preferable groups represented by $A^1$.

The silicon compound of the formula (IV) in which $A^2$ is a non-cyclic amino group of the formula (II) includes [3-(dimethyl-amino)propyl]trimethoxysilane, [3-(diethylamino)propyl]trimethoxysilane, [3-(dimethyl-amino)propyl]triethoxysilane, [3-(diethylamino)propyl]triethoxysilane, [(3-methyl-3-ethylamino)propyl]trimethoxysilane, [(3-methyl-3-ethylamino)propyl]triethoxysilane, [3-(dimethyl-amino)propyl]methyldimethoxysilane, [3-(diethylamino)propyl]methyldimethoxysilane, [3-(dimethyl-amino)propyl]ethyldimethoxysilane, [3-(diethylamino)propyl]ethyldimethoxysilane, [3-(dimethyl-amino)propyl]dimethyl-methoxysilane, [3-(dimethyl-amino)propyl]diethylmethoxysilane, [3-(diethylamino)propyl]dimethyl-methoxysilane, [3-(diethylamino)propyl]diethylmethoxysilane, [(3-methyl-3-ethylamino)propyl]methyldimethoxysilane, [(3-methyl-3-ethylamino)propyl]ethyldimethoxysilane, [3-(dimethyl-amino)propyl]methyldiethoxysilane, [3-(diethylamino)propyl]methyldiethoxysilane, [3-(dimethyl-amino)propyl]ethyldiethoxysilane, [3-(diethylamino)propyl]ethyldiethoxysilane, [3-(dimethyl-amino)propyl]dimethyl-ethoxysilane, [3-(dimethyl-amino)propyl]diethylethoxysilane, [3-(diethylamino)propyl]dimethylethoxysilane, [3-(diethylamino)propyl]diethylethoxysilane, [(3-methyl3-ethylamino)propyl]methyldiethoxysilane, [(3-methyl3-ethylamino)propyl]ethyldiethoxysilane, [3-(dimethoxymethylamino)propyl]trimethoxysilane, [3-(dimethoxyethylamino)propyl]trimethoxysilane, [3-(dimethoxymethylamino)propyl]triethoxysilane, [3-(dimethoxyethylamino)propyl]triethoxysilane, [3-(diethoxyethylamino)propyl]trimethoxysilane, [3-(diethoxymethylamino)propyl]trimethoxysilane, [3-(diethoxyethylamino)propyl]triethoxysilane, [3-(diethoxymethylamino)propyl]triethoxysilane, {3-[di(trimethylsilyl)amino]propyl}trimethoxysilane, {3-[di(trimethylsilyl)amino]propyl}triethoxysilane, {3-[di(t-butyldimethyl-silyl)amino]propyl}trimethoxysilane, {3-[di(t-butyldimethyl-silyl)amino]propyl}triethoxysilane, {3-[di(trimethylsilyl)amino]propyl}methyldimethoxysilane, {3-[di(trimethylsilyl)amino]propyl}methyldiethoxysilane, {3-[di(t-butyldimethyl-silyl)amino]propyl}methyldimethoxysilane, {3-[di(t-butyldimethyl-silyl)amino]propyl}methyldiethoxysilane, {3-[di(trimethylsilyl)amino]propyl}dimethyl-methoxysilane, {3-[di(trimethylsilyl)amino]propyl}dimethyl-ethoxysilane, {3-[di(t-butyldimethyl-silyl)amino]propyl}dimethyl-methoxysilane, {3-[di(t-butyldimethyl-silyl)amino]propyl}, [3-(ethylmethylamino)propyl]trimethoxysilane, [3-(ethylmethylamino)propyl]triethoxysilane, [3-(ethylmethylamino)propyl]methyldimethoxysilane, [3-(ethylmethylamino)propyl]ethyldimethoxysilane, [3-(ethylmethylamino)propyl]methyldiethoxysilane, [3-(ethylmethylamino)propyl]ethyldiethoxysilane and the like.

A the silicon compound in which $A^2$ is a non-cyclic amino group of the formula (II), [3-(diethylamino)propyl]trimethoxysilane and [3-(dimethyl-amino)propyl]triethoxysilane are preferable from the standpoint of enhancement of fuel saving. Particularly, [3-(diethylamino)propyl]methyldimethoxysilane is preferable from the standpoint of simultaneous satisfaction of compound availability and preservation stability for a long period of time, together with fuel saving.

The silicon compound of the formula (IV) in which $A^2$ is a cyclic amino group of the formula (II) includes 3-morpholinopropyltrimethoxysilane, 3-morpholinopropyltriethoxysilane, 3-morpholinopropylmethyldimethoxysilane, 3-morpholinopropylethyldimethoxysilane, 3-morpholinopropylmethyldiethoxysilane, 3-morpholinopropylethyldiethoxysilane, 3-piperidinopropyltrimethoxysilane, 3-piperidinopropyltriethoxysilane, 3-piperidinopropylmethyldimethoxysilane, 3-piperidinopropylethyldimethoxysilane, 3-piperidinopropylmethyldiethoxysilane, 3-piperidinopropylethyldiethoxysilane, N-(3-trimethoxysilylpropy)-4,5-dihydro-imidazole, N-(3-triethoxysilylpropyl)-4,5-dihydro-imidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropyltriethoxysilane, 3-hexamethyleneiminopropylmethyldimethoxysilane, 3-hexamethyleneiminopropylethyldimethoxysilane, 3-hexamethyleneiminopropylmethyldiethoxysilane, 3-hexamethyleneiminopropylethyldiethoxysilane and the like.

As the silicon compound in which $A^2$ is a cyclic amino group of the formula (II), preferable are N-(3-trimethoxysilylpropyl)-4,5-dihydro-imidazole, N-(3-triethoxysilylpropyl)-4,5-dihydro-imidazole, N-(3-trimethoxysilylpropyl)-4,5-imidazole and N-(3-triethoxysilylpropyl)-4,5-imidazole, from the standpoint of enhancement of fuel saving.

Examples of the silicon compound of the formula (IV) in which $A^2$ is a group of the formula (III) include 3-glycidoxypropyltrimethoxysilane, 3-glycidoxypropyltriethoxysilane, 3-glycidoxypropylmethyldimethoxysilane, 3-glycidoxypropylethyldimethoxysilane, 3-glycidoxypropylmethyldiethoxysilane, 3-glycidoxypropylethyldiethoxysilane and the like.

As the silicon compound in which $A^2$ is a group of the formula (III), (3-glycidoxypropyl)trimethoxysilane is preferable from the standpoint of enhancement of fuel saving, and from the standpoint of compound easy availability and enhancement of preservation stability for a long period of time.

The addition of a silicon compound of the formula (IV) in the step 2 is carried out at a time under stirring of a hydrocarbon solution. The feed rate of a silicon compound is preferably not less than 6 mmol/sec/m$^3$, more preferably not less than 10 mmol/sec/m$^3$ per unit volume of a hydrocarbon solvent and per unit time, from the standpoint of enhancement of fuel saving (from the standpoint of increasing the area of the peak L of a conjugated diene polymer). From the standpoint of enhancing operability, the feed rate is preferable not more than 10000 mmol/sec/m$^3$.

The feed amount of a silicon compound is preferably not less than 0.5 mol, more preferably not less than 0.8 mol per mol of an alkali metal of an alkali metal catalyst used in the step 1, from the standpoint of enhancement of fuel saving (from the standpoint of increasing the area of the peak L of a conjugated diene polymer). From the standpoint of enhancement of economic efficiency in production, it is preferably not more than 10 mol, more preferably not more than 2 mol.

The silicon compound may be added, in the form of solution dissolved in a solvent which does not deactivate an alkali metal catalyst such as tetrahydrofuran, and hexane, to a hydrocarbon solution The concentration of a conjugated diene polymer in a hydrocarbon solution before addition of a silicon compound is preferably not more than 30% by weight, more preferably not more than 20% by weight, from the standpoint of enhancement of fuel saving (from the standpoint of increasing the area of the peak L of a conjugated diene polymer). Further, from the standpoint of enhancement of productivity, it is preferably not less than 5% by weight, more preferably not less than 10% by weight.

The stirring speed of a hydrocarbon solution in adding a silicon compound is preferably not less than 30 rpm, more preferably not less than 50 rpm, further preferably nor less than 70 rpm, from the standpoint of enhancement of fuel saving (from the standpoint of increasing the area of the peak L of a conjugated diene polymer). From the standpoint of enhancing economic efficiency, it is preferably not more than 400 rpm, more preferably not more than 300 rpm, further preferably not more than 200 rpm. The temperature of a hydrocarbon solution in adding a silicon compound is usually 35 to 65° C.

It is preferable to stir the hydrocarbon solution after addition of a silicon compound. The stirring speed is usually not less than 100 rpm, and the stirring temperature is usually not less than 35° C., and the stirring time is usually 1 second to 30 minutes.

Further, a coupling agent of the following formula may be added to a hydrocarbon solution of a conjugated diene polymer having at its end an alkali metal obtained in the step, before or after addition of a silicon compound of the formula (IV).

$R^9$ represents an alkyl group, alkenyl group, cycloalkenyl group or aromatic hydrocarbon group, M represents a silicon atom or tin atom, L represents a halogen atom, and a represents an integer of 0 to 2.

Examples of the coupling agent of the above-described formula include silicon tetrachloride, methyltrichlorosilane, dimethyl-dichlorosilane, trimethylchlorosilane, tin tetrachloride, methyltrichlorotin, dimethyl-dichlorotin, and trimethylchlorotin.

The feed amount of the coupling agent is preferably not less than 0.03 mol, more preferably not less than 0.05 mol per mol of an alkali metal of an alkali metal catalyst from the standpoint of enhancement of kneading property of a conjugated diene polymer. From the standpoint of enhancement of fuel saving, it is preferably not more than 0.4 mol, more preferably not more than 0.3 mol.

The conjugated diene polymer can be recovered from a hydrocarbon solution of the conjugated diene polymer after treatment of the step 2 by conventional recovering methods, for example, (1) a method of adding a coagulant to a hydrocarbon solution of a conjugated diene polymer, (2) a method of adding steam to a hydrocarbon solution of a conjugated diene polymer. The recovered conjugated diene polymer may be dried by conventional driers such as a band drier, and extrusion type drier.

The conjugated diene polymer of the present invention can be formed into a conjugated diene polymer composition by mixing other polymer components, additives and the like.

Examples of the other polymer components include conventional styrene-butadiene copolymer rubber, polybutadiene rubber, butadiene-isoprene copolymer rubber, and butyl rubber. Also examples of the other polymer components include natural rubber, ethylene propylene copolymer, and ethylene octene copolymer. Each of these polymer components may be used in combination with another or more.

As the additives, conventional additives can be used and examples thereof include vulcanziers such as sulfur; vulcanizing accelerators such as thiazole vulcanizing accelerator, thiuram vulcanizing accelerator, and sulfeneamide vulcanizing accelerator; vulcanizing activators such as stearic acid, and zinc oxide; organic peroxides; fillers such as silica, carbon black, calcium carbonate, and talc; silanecoupling agent; extender oils; processing aids; antioxidants; lubricants.

In the case of use of a conjugated diene polymer composition prepared by mixing fillers in a conjugated diene polymer of the present invention, it is preferable to use silica as the filler.

As the method for producing a conjugated diene polymer composition by mixing other polymer components, additives and the like in a conjugated diene polymer of the present invention, there can be used conventional methods, for example, a method of kneading components by a conventional mixer such as roll mixer and Banbury mixer.

When silica is mixed in a conjugated diene polymer of the present invention to give a conjugated diene polymer composition, the amount of silica is usually 10 to 150 parts by weight. The amount is preferably not less than 20 parts by weight, more preferably not less than 30 parts by weight from the standpoint of enhancing fuel saving, assuming the amount of a conjugated diene polymer of the present invention as 100 parts by weight. From the standpoint of enhancing reinforcing property, it is preferably not more than 120 parts by weight, more preferably not more than 100 parts by weight.

In the case of mixing other polymer components in a conjugated diene polymer of the present invention, the amount of a conjugated diene polymer of the present invention is preferably not less than 10 parts by weight, more preferably not less than 20 parts by weight from the standpoint of enhancement of fuel saving, assuming the total amount of the polymer components as 100 parts by weight.

In the case of mixing fillers other than silica in a conjugated diene polymer of the present invention, the amount of fillers other than silica is preferably not more than 50 parts by weight, more preferably not more than 30 parts by weight from the standpoint of enhancement of fuel saving, assuming the total amount of the fillers as 100 parts by weight. From the standpoint of enhancing reinforcing property, it is preferably not less than 1 part by weight, more preferably not less than 3 parts by weight.

The method for producing a composition prepared by mixing a conjugated diene polymer of the present invention with silica is, for example, a production method having the step 3 in addition to the above-described step 1 and step 2.

Step 3: mixing the conjugated diene polymer obtained in the step 2 and silica.

In the step 3, other polymer components and other additives and the like may be mixed. As the mixing method in the step 3, conventional methods, for example, methods of kneading components by conventional mixer such as roll mixer and Banbury mixer can be used.

Regarding the kneading conditions in the step 3, in the case of mixing additives other than vulcanziers and vulcanizing accelerators, the kneading temperature is usually 50 to 200° C., preferably 80 to 190° C., the kneading time is usually 30 seconds to 30 minutes, preferably 1 minute to 30 minutes. In the case of mixing vulcanziers and vulcanizing accelerators, the kneading temperature is usually not higher than 100° C., preferably room temperature to 80° C. A composition prepared by mixing vulcanziers and vulcanizing accelerators is usually subjected to a vulcanization treatment such as press vulcanization. The vulcanization temperature is usually 120 to 200° C., preferably 140 to 180° C.

In the step 3, the amount of the conjugated diene polymer obtained in the step 2, the amount of silica, the amounts of other polymer components and the amounts of fillers other than silica are preferably as described above.

The conjugated diene polymer and conjugated diene polymer composition of the present invention are excellent in fuel saving. They are excellent also in processing property, gripping property, abrasion resistance, strength and the like.

The conjugated diene polymer and conjugated diene polymer composition of the present invention are used for tires, shoe soles, floor materials, vibration-proofing materials and the like, in particularly, used suitably for tires.

EXAMPLES

The present invention will be illustrated by examples below.

The measurements of physical properties were carried out by the following methods.
1. Mooney viscosity ($ML_{1+4}$)
The Mooney viscosity ($ML_{1+4}$) was measured according to JIS K6300 (1994).
2. Vinyl content (unit: mol %)
The vinyl content was determined by the absorption intensity around 910 $cm^{-1}$ which is an absorption peak of a vinyl group.
3. Styrene unit content (unit: % by weight)
The styrene unit content was determined from refractive index according to JIS K6383 (1995).
4. Molecular weight distribution curve
A measurement was carried out under the conditions (1) to (8) by gel permeation chromatography (GPC).
(1) Apparatus: HLC-8020 manufactured by Tosoh Corporation
(2) Separation column: GMH-XL manufactured by Tosoh Corporation (two columns are serially connected)
(3) Measurement temperature: 40° C.
(4) Carrier: tetrahydrofuran
(5) Flow rate: 0.6 mL/minute
(6) Injection amount: 5 μL
(7) Detector: differential refractometer
(8) Molecular weight standard: standard polystyrene
5. Fuel saving
The loss tangent at a temperature of 70° C. (tan δ (70° C.)) was measured under conditions of a strain of 1% and a frequency of 10 Hz using a viscoelasticity measuring apparatus (manufactured by Toyo Seiki K.K.). When this value is smaller, fuel saving is more excellent.

Example 1

A stainless steel polymerization reactor having an internal content of 20 liter was washed and dried, and substituted with dry nitrogen, then, 10.2 kg of hexane (specific gravity 0.68 g/cm³), 608 g of 1,3-butadiene, 192 g of styrene, 6.1 ml of tetrahydrofuran and 5.0 ml of ethylene glycol diethylether were added. Next, 13.8 mmol of n-butyllithium in the form of n-hexane solution was added, and the temperature in the polymerization reactor was adjusted to 65° C., and 1,3-butadiene and styrene were supplied to the polymerization reactor and polymerized for 3 hours, to obtain a polymer solution. In polymerization for 3 hours, the supplying amount of 1,3-butadiene was 912 g, and the supplying amount of styrene was 288 g.

The resultant polymer solution was stirred at a stirring speed of 130 rpm, and 11.3 mmol of (3-(diethylamino)propyl)trimethoxysilane was added to the polymer solution in 1 second, and the polymer solution was stirred for 60 minutes, then, 10 ml of methanol was added to the polymer solution, further, the polymer solution was stirred for 5 minutes.

To the polymer solution was added 8 g of 2-tertiary butyl 6-(3-tertiary butyl 2-hydroxy-5-methylbenzyl)-4-methylphenyl acrylate (manufactured by Sumitomo Chemical Co., Ltd., trade name: Sumilizer GM) and 4 g of pentaerythrityl tetrakis(3-lauryl propionate) (manufactured by Sumitomo Chemical Co., Ltd., trade name: Sumilizer TP-D), then, the polymer solution was evaporated at ambient temperature over a period of 24 hours, further, dried under reduced pressure at 55° C. for 12 hours, to obtain a polymer. The results of measurements of physical properties of the polymer were shown in Table 1.

100 parts by weight of the resultant polymer, 78.4 parts by weight of silica (manufactured by Degussa, trade name: Ultrasil VN3-G), 6.4 parts by weight of silane coupling agent (manufactured by Degussa, trade name: Si 69), 6.4 parts by weight of carbon, 47.6 parts by weight of extender oil (manufactured by Kyodo Oil Co., Ltd., trade name: X-140), 1.5 parts by weight of antioxidant (manufactured by Sumitomo Chemical Co., Ltd., trade name: Antigen 3C), 2 parts by weight of stearic acid, 2 parts by weight of zinc flower, 1 part by weight vulcanizing accelerator (manufactured by Sumitomo Chemical Co., Ltd., trade name: Soccinol CZ), 1 part by weight of vulcanizing accelerator (manufactured by Sumitomo Chemical Co., Ltd., trade name: Soccinol D), 1.5 parts by weight wax (manufactured by Ouchi Shinko Chemical Industry, trade name: Sannoc N) and 1.4 parts by weight of sulfur were kneaded by Laboplastomill, and the resultant kneaded material was molded into a sheet by 6 inch rolls. The sheet was heated at 160° C. for 45 minutes to be vulcanized, and the fuel saving of the vulcanized sheet was evaluated. The results were shown in Table 1.

Comparative Example 1

The same procedure as in Example 1 was carried out excepting that 20.7 mmol of n-butyllithium in the form of n-hexane solution was added and polymerization initiated and 18.2 mmol of [3-(diethylamino)propyl]trimethoxysilane was added, in the form of a solution in 50 ml of hexane, to the polymer solution over a period of 10 minutes. The results of measurements of physical properties of the resultant polymer and results of evaluation of fuel saving of the vulcanized sheet were shown in Table 1.

TABLE 1

|  |  | Example 1 | Comparative Example 1 |
|---|---|---|---|
| Production |  |  |  |
| Feed time of silicon compound of the formula (IV) |  | 1 second | 10 minutes |
| Feed time of silicon compound of the formula (IV) | mmol/sec/m³ | 750 | 2.0 |
| physical properties |  |  |  |
| Mooney viscosity |  | 78 | 34 |
| vinyl content | % | 58 | 59 |
| styrene unit content | % by weight | 25 | 25 |
| molecular weight |  |  |  |

TABLE 1-continued

|  |  | Example 1 | Comparative Example 1 |
|---|---|---|---|
| distribution curve |  |  |  |
| Peak area of peak at lower molecular weight side | % | 79 | 33 |
| fuel saving tanδ(70° C.) | % | 0.121 | 0.133 |

Example 2

A stainless steel polymerization reactor having an internal content of 20 liter was washed and dried, and substituted with dry nitrogen, then, 10.2 kg of hexane (specific gravity 0.68 g/cm$^3$), 608 g of 1,3-butadiene, 192 g of styrene, 6.1 ml of tetrahydrofuran and 5.0 ml of ethylene glycol diethylether were added. Next, 16.7 mmol of n-butyllithium in the form of n-hexane solution was added, and the temperature in the polymerization reactor was adjusted to 65° C., and 1,3-butadiene and styrene were supplied to the polymerization reactor and polymerized for 3 hours, to obtain a polymer solution. In polymerization for 3 hours, the supplying amount of 1,3-butadiene was 912 g, and the supplying amount of styrene was 288 g.

The resultant polymer solution was stirred at a stirring speed of 130 rpm, and 14.3 mmol of 3-glycidoxypropyltrimethoxysilane was added to the polymer solution in 1 second, and the polymer solution was stirred for 60 minutes, then, 10 ml of methanol was added to the polymer solution, further, the polymer solution was stirred for 5 minutes.

To the polymer solution was added 8 g of 2-tertiary butyl 6-(3-tertiary butyl 2-hydroxy-5-methylbenzyl)-4-methylphenyl acrylate (manufactured by Sumitomo Chemical Co., Ltd., trade name: Sumilizer GM) and 4 g of pentaerythrityl tetrakis(3-lauryl propionate) (manufactured by Sumitomo Chemical Co., Ltd., trade name: Sumilizer TP-D), then, the polymer solution was evaporated at ambient temperature over a period of 24 hours, further, dried under reduced pressure at 55° C. for 12 hours, to obtain a polymer. The results of measurements of physical properties of the polymer were shown in Table 2.

100 parts by weight of the resultant polymer, 78.4 parts by weight of silica (manufactured by Degussa, trade name: Ultrasil VN3-G), 6.4 parts by weight of silane coupling agent (manufactured by Degussa, trade name: Si 69), 6.4 parts by weight of carbon, 47.6 parts by weight of extender oil (manufactured by Kyodo Oil Co., Ltd., trade name: X-140), 1.5 parts by weight of antioxidant (manufactured by Sumitomo Chemical Co., Ltd., trade name: Antigen 3C), 2 parts by weight of stearic acid, 2 parts by weight of zinc flower, 1 part by weight vulcanizing accelerator (manufactured by Sumitomo Chemical Co., Ltd., trade name: Soccinol CZ), 1 part by weight of vulcanizing accelerator (manufactured by Sumitomo Chemical Co., Ltd., trade name: Soccinol D), 1.5 parts by weight wax (manufactured by Ouchi Shinko Chemical Industry, trade name: Sannoc N) and 1.4 parts by weight of sulfur were kneaded by Laboplastomill, and the resultant kneaded material was molded into a sheet by 6 inch rolls. The sheet was heated at 160° C. for 45 minutes to be vulcanized, and the fuel saving of the vulcanized sheet was evaluated. The results were shown in Table 2.

Comparative Example 2

The same procedure as in Example 2 was carried out excepting that 3-glycidoxypropyltrimethoxysilane was added, in the form of a solution in 50 ml of tetrahydrofuran, to the polymer solution over a period of 10 minutes. The results of measurements of physical properties of the resultant polymer and results of evaluation of fuel saving of the vulcanized sheet were shown in Table 2.

TABLE 2

|  |  | Example 2 | Comparative Example 2 |
|---|---|---|---|
| Production |  |  |  |
| Feed time of silicon compound of the formula (IV) |  | 1 second | 10 minutes |
| Feed speed of silicon compound of the formula (IV) | mmol/sec/m$^3$ | 950 | 1.6 |
| physical properties |  |  |  |
| Mooney viscosity | — | 59 | 75 |
| vinyl content | % | 60 | 60 |
| styrene unit content | % by weight | 25 | 25 |
| molecular weight distribution curve |  |  |  |
| Peak area of peak at lower molecular weight side | % | 52 | 29 |
| fuel saving tanδ (70° C.) | % | 0.141 | 0.147 |

INDUSTRIAL APPLICABILITY

According to the present invention, a conjugated diene polymer which is capable of producing a polymer composition excellent in energy saving in the case of mixing of a filler, particularly mixing of silica, a method for producing the conjugated diene polymer, a polymer composition obtained by mixing the conjugated diene polymer and silica, and a method for producing the polymer composition, are provided.

The invention claimed is:

1. A method for producing a conjugated diene polymer composition, comprising steps 1, 2 and 3:

step 1: polymerizing a monomer containing a conjugated diene in a hydrocarbon solvent in the presence of an alkali metal catalyst to obtain a conjugated diene polymer having at its end an alkali metal derived from the catalyst, step 2: adding a silicon compound of the formula (IV):

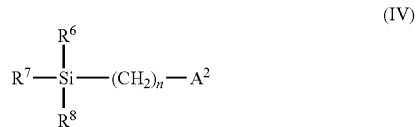

(IV)

wherein $R^6$, $R^7$, and $R^8$ represent independently a hydrocarbon group having 1 to 4 carbon atoms or a hydrocarbon oxy group having 1 to 4 carbon atoms, at least one of $R^6$, $R^7$, and $R^8$ is a hydrocarbon oxy group having 1 to 4 carbon atoms, n represents an integer of 0 to 10, and $A^2$ represents a group of formula (II):

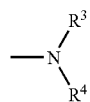 (II)

wherein $R^3$ and $R^4$ represent independently a hydrocarbon group having 1 to 6 carbon atoms optionally having a nitrogen atom, oxygen atom or silicon atom, and $R^3$ and $R^4$ may be connected to form a cyclic structure, to the hydrocarbon solution of the conjugated diene polymer, to modify the conjugated diene polymer with the silicon compound, and step 3: mixing the conjugated diene polymer obtained in step 2 and silica, wherein in step 2, the feed amount of the silicon compound of the formula (IV) is 0.1 to 10 mol per mol of the alkali metal of the alkali metal catalyst used in the step 1, and the feed rate of the silicon compound of the formula (IV) is not less than 6 mmol/sec/m$^3$ per unit volume of the hydrocarbon solution and per unit time.

2. The method according to claim 1, wherein all of $R^6$, $R^7$ and $R^8$ in the formula (IV) represent a hydrocarbon oxy group having 1 to 4 carbon atoms.

3. The method according to claim 1, wherein, in the step 3, silica is added in an amount of 10 to 150 parts by weight per 100 parts by weight of the conjugated diene polymer obtained in the step 2.

4. The method according to claim 2, wherein, in the step 3, silica is added in an amount of 10 to 150 parts by weight per 100 parts by weight of the conjugated diene polymer obtained in the step 2.

5. The method according to claim 1, wherein all of $R^6$, $R^7$ and $R^8$ in the formula (IV) represent a hydrocarbon oxy group having 1 to 4 carbon atoms.

6. The method according to claim 1, wherein, in the step 3, silica is added in an amount of 10 to 150 parts by weight per 100 parts by weight of the conjugated diene polymer obtained in the step 2.

7. The method according to claim 5, wherein, in the step 3, silica is added in an amount of 10 to 150 parts by weight per 100 parts by weight of the conjugated diene polymer obtained in the step 2.

* * * * *